(12) United States Patent
Mori et al.

(10) Patent No.: US 8,615,125 B2
(45) Date of Patent: Dec. 24, 2013

(54) APPARATUS AND METHOD FOR INSPECTING SURFACE STATE

(75) Inventors: Yasumoto Mori, Joyo (JP); Daisuke Mitsumoto, Nagaokakyo (JP); Yasuhiro Ohnishi, Kyotanabe (JP); Shree Nayar, New York, NY (US)

(73) Assignee: Omron Corporation, Kyoto (JP)

( * ) Notice: Subject to any disclaimer, the term of this patent is extended or adjusted under 35 U.S.C. 154(b) by 599 days.

(21) Appl. No.: 12/901,166

(22) Filed: Oct. 8, 2010

(65) Prior Publication Data

US 2012/0087566 A1    Apr. 12, 2012

(51) Int. Cl.
*G06K 9/00* (2006.01)

(52) U.S. Cl.
USPC .................. 382/141; 356/237.2; 356/239.7

(58) Field of Classification Search
None
See application file for complete search history.

(56) References Cited

U.S. PATENT DOCUMENTS

| | | | |
|---|---|---|---|
| 4,989,083 A * | 1/1991 | Eino | 348/135 |
| 7,062,080 B2 * | 6/2006 | Oshiumi et al. | 382/141 |
| 7,715,616 B2 * | 5/2010 | Moriya et al. | 382/149 |
| 7,778,458 B2 * | 8/2010 | Hiraoka | 382/141 |
| 8,106,896 B2 * | 1/2012 | Hwang | 345/204 |
| 8,289,386 B2 * | 10/2012 | Kagawa | 348/88 |

FOREIGN PATENT DOCUMENTS

| | | |
|---|---|---|
| JP | 5322543 A | 12/1993 |
| JP | 3634985 A | 3/2001 |
| JP | 200997977 A | 11/2010 |

OTHER PUBLICATIONS

English Patent Abstract of JP5322543 from espacenet, published Dec. 7, 1993, 1 page.

* cited by examiner

*Primary Examiner* — Samir Ahmed
(74) *Attorney, Agent, or Firm* — Osha Liang LLP

(57) ABSTRACT

A surface state inspection apparatus has a lighting device that irradiates an inspection target placed on a stage with light, an imaging device that images the inspection target, and a detection device that detects a surface defect of the inspection target by analyzing a first inspection image obtained by the imaging device. The lighting device is a surface light source that includes a light emission region having a predetermined size and, in the lighting device, portions of light emitted from positions in the light emission region differ from each other in a spectral distribution. The detection device detects a portion in which a hue is different from that of its surrounding portion in the inspection target surface as a flaw. The detection device detects a portion in which the hue is substantially equal to that of its surrounding portion while brightness is different from that of its surrounding portion as a stain.

5 Claims, 17 Drawing Sheets

RED LIGHT (R)
CHANGE IN
X-DIRECTION

GREEN LIGHT (G)
CONSTANT

BLUE LIGHT (B)
CHANGE IN
Y-DIRECTION

RED LIGHT (R)

GREEN LIGHT (G)

BLUE LIGHT (B)

FIRST INSPECTION IMAGE

SECOND INSPECTION IMAGE

APPARATUS AND METHOD FOR INSPECTING SURFACE STATE

BACKGROUND OF THE INVENTION

1. Technical Field

The present invention relates to a technique of inspecting a surface state of an object.

2. Related Art

There is well known a technique of inspecting the surface state of the object by analyzing an image obtained with a camera or an image sensor. This is generally called appearance inspection. For example, the appearance inspection is utilized to detect surface defects of magnetic and optical disks, a copper-clad laminate, a silicon wafer, a steel plate and a steel sphere, and a molded product.

For example, in a technique proposed in Japanese Unexamined Patent Publication No. 5-322543, a flat-plate surface light source irradiates an object surface with inspection light having a lightness gradient, and a portion whose lightness gradient is different from that of its surrounding portion in an image is determined as a defect. In a technique proposed in Japanese Unexamined Patent Publication No. 2009-97977, four pieces of lighting disposed in different directions are sequentially lit to take four images, and existence or nonexistence of a flaw or irregularity is discriminated from an image obtained by computing exclusive OR of the four images. In a technique proposed in Japanese Patent No. 3634985, the object is irradiated with measuring light such that a focal line is generated in the object surface, a change in intensity of reflected light is observed in the object surface while the object is vertically moved, thereby measuring the depth of the flaw.

SUMMARY (1) Distinction Between Flaw and Stain

Occasionally, depending on the inspection target or the purpose, there is a need to detect only one of "flaw" and "stain" adhering to the object surface as the defect or a need to detect both "flaw" and "stain" as the defect to discriminate a kind of the defect. However, as shown in FIG. 17A, both the flaw and the stain are similarly observed as a dark portion (portion darker than that of surroundings) in the inspection image in which typical lighting is used. Therefore, although the flaw and the stain are easily detected without distinguishing between the flaw and the stain, it is difficult to discriminate whether the detected defect is the flaw or the stain.

(2) Detection Irrespective of Flaw Direction

Particularly for the linear flaw, the flaw can be detected as the dark portion on the inspection image when an irradiation direction of the lighting has a large angle with respect to the flaw direction. However, as shown in FIG. 17B, when the irradiation direction of the lighting is substantially identical to the flaw direction, the flaw does not clearly become the dark portion on the inspection image, it is difficult to detect a flaw B in the inspection image using lighting A, and it is difficult to detect a flaw A in the inspection image using lighting B. Therefore, when the flaw direction is indefinite or unknown, it is necessary that the imaging be repeated plural times while the irradiation direction of the lighting is changed.

(3) Determination of Kind and Depth of Flaw

For the inspection in which the typical lighting is used, as shown in FIG. 17C, an irregularity difference or a depth difference of the flaw hardly emerge as the feature on the inspection image. Depending on the inspection target and the purpose, occasionally it is not necessary that the flaw having the minute depth be regarded as the defect, or occasionally only the projected flaw is regarded as the defect (fault) while the recessed flaw is not regarded as the defect. However, it is difficult to accurately make the discrimination from the inspection image.

There is a demand for a technique of being able to simply and accurately perform the inspections (1) to (3) for the purpose of enlargement of the application target and improvement of convenience in the appearance inspection apparatus.

One or more embodiments of the present invention provides a technique of being able to accurately discriminate the flaw and the stain from one or a plurality of inspection images. One or more embodiments of the present invention provides a technique of being able to accurately discriminate the flaw and the stain from one or the plurality of inspection images irrespective of the flaw direction. One or more embodiments of the present invention provides a technique of being able to discriminate the irregularity and depth of the flaw while being able to accurately discriminate the flaw and the stain from one or the plurality of inspection images irrespective of the flaw direction.

According to one or more embodiments of the present invention, special structure lighting irradiates the inspection target with light such that the flaw and stain, the recessed flaw and projected flaw, and the deep flaw and shallow flaw emerge as different features on the inspection image, respectively.

Specifically, a surface state inspection apparatus according to a first aspect of the invention includes: a lighting device that irradiates an inspection target placed on a stage with light; an imaging device that images the inspection target; and a detection device that detects a surface defect of the inspection target by analyzing a first inspection image obtained by the imaging device, wherein the lighting device is a surface light source that includes a light emission region having a predetermined size and, in the lighting device, pieces of light emitted from positions in the light emission region differ from each other in a spectral distribution, the detection device detects a portion in which a hue is different from that of its surrounding portion in the inspection target surface as a flaw, and the detection device detects a portion in which the hue is substantially equal to that of its surrounding portion while brightness is different from that of its surrounding portion as a stain.

For example, the lighting device can be formed by a surface light source that emits the light in which a plurality of lighting patterns having different colors whose emission intensity distributions are different from each other are overlapped.

The use of the structure lighting can vary the spectral distribution of the light incident to the inspection target surface in each incident angle. In the case where the defect does not exist in the inspection target surface (that is, for the flat surface), the inspection image is obtained such that a color (spectral feature) of the light incident from a regular reflection direction emerges substantially evenly when viewed from the imaging device. It is assumed that a reflection property of the inspection target surface is that of a mirror surface or close to that of the mirror surface. When the stain adheres to the inspection target surface, the reflection property changes in the stain portion to decrease a quantity of reflected light, thereby obtaining the image in which only brightness is reduced while the hue is kept constant. On the other hand, when the flaw (irregularity) exists in the surface, the regular reflection direction changes in an inclined surface of the flaw portion, thereby changing the color of the reflected light observed with the imaging device. That is, the hue of the image changes in the flaw portion. When the above-described characteristics are utilized, not only the flaw and the stain can be detected from one inspection image, but also the flaw and the stain can be discriminated from one inspection image. Additionally, in the structure lighting, because the inspection target can be irradiated with light at various incident angles, the inspection can be performed irrespective of the direction of the flaw or stain.

In the inspection image obtained by the structure lighting according to one or more embodiments of the invention, as described above, the different hues emerge according to the inclination angle (that is, the regular reflection direction) of the surface. Accordingly, a shape feature of the flaw can be recognized by analyzing the situation of the change in hue that emerges in the flaw portion of the inspection image. Specifically, detection device can determine the flaw irregularity based on a direction of the change in hue in the portion detected as the flaw. The detection device can determine the flaw depth based on a degree of the change in hue in the portion detected as the flaw.

Occasionally a colored stain adheres to the surface depending on the inspection target. For the colored stain, because the color of the stain emerges on the inspection image irrespective of the color of the light incident from the regular reflection direction, it is difficult to discriminate between the stain and the flaw only by checking a difference in hue between the colored stain portion and its surrounding portion (portion in which the stain does not exist).

Therefore, the detection device obtains a second inspection image of the inspection target by changing a constitution of the spectral distributions of the pieces of light emitted from the positions in the light emission region of the lighting device or by performing the imaging while changing a relative position between the light emission region and the inspection target, when the portion detected as the flaw exists in the first inspection image. When the portion detected as the flaw in the first inspection image is truly the flaw, the portion should emerge with the different hue in the second inspection image. On the other hand, when the portion is not the flaw but the colored stain, the substantially equal hues emerge in both the first inspection image and the second inspection image. The flaw and the colored stain can be discriminated by utilizing the above-described properties.

A surface state inspection apparatus according to a second aspect of the invention includes: a lighting device that irradiates an inspection target placed on a stage with light; an imaging device that images the inspection target; and a detection device that detects a surface defect of the inspection target by analyzing an inspection image obtained by the imaging device, wherein the lighting device is a surface light source that sequentially emits a plurality of lighting patterns having emission intensity distributions different from each other, the detection device determines a ratio of pixel values between a plurality of inspection images that is obtained by shooting with the lighting patterns, the detection device detects a portion, in which the ratio of the pixel values is different from that of its surrounding portion in the inspection target surface, as a flaw, and the detection device detects a portion in which the ratio of the pixel values is substantially equal to that of its surrounding portion while brightness is different from that of its surrounding portion as a stain.

In the second aspect, the image in which only the brightness is reduced while the ratio of the pixel values is substantially kept constant is obtained when the stain adheres to the inspection target surface. On the other hand, when the flaw (irregularity) exists in the surface, the ratio of the pixel values changes because the regular reflection direction changes in the inclined surface of the flaw portion. When the above-described properties are utilized, not only the flaw and the stain can be detected from the plurality of inspection images, but also the flaw and the stain can be discriminated from the plurality of inspection images. Additionally, in the structure lighting, because the inspection target can be irradiated at various incident angles, the inspection can be performed irrespective of the direction of the flaw or stain.

In the second aspect, the irregularity of the flaw can be discriminated based on a direction of a change of the ratio of the pixel values in the portion detected as the flaw. A depth of the flaw can be discriminated based on a degree of the change of the ratio of the pixel values in the portion detected as the flaw.

According to one or more embodiments of the present invention, the plurality of lighting patterns are irradiated with pieces of light having an identical color when a colored stain exists. When the pieces of light having the identical color are used, the quantity of reflected light is reduced by a fixed ratio irrespective of the color of the stain, thereby obtaining the image in which only the brightness is reduced while the ratio of the pixel values is substantially kept constant. Accordingly, the colored stain can be detected even if the second inspection image is taken while the lighting condition is not changed unlike the first aspect. In the second aspect, similarly to the first aspect, obviously the second inspection image is taken to detect the colored stain while the lighting condition is changed.

In one or more embodiments of the present invention, the emission intensity distribution of each lighting pattern is set such that emission intensity changes linearly with respect to an angle about a central axis, and the central axis is formed by a predetermined straight line that is parallel to the stage to pass through a point at which the inspection target is disposed. By using such a lighting device, accurate measurement can be performed even if the object has the uneven reflectance property or rough surface. Occasionally the exact linearity is hardly realized due to a structural design factor. In such cases, the linearity may substantially be realized. That is, in one or more embodiments of the invention, "emission intensity changes linearly" means a concept including "emission intensity changes substantially linearly".

One or more embodiments of the invention can be recognized as a surface state inspection apparatus including at least part of the device. One or more embodiments of the invention can be recognized as a surface state inspection method including at least part of the processing or a program realizing the method. One or more embodiments of the invention can be made by combining the devices and the pieces of processing as much as possible.

According to one or more embodiments of the present invention, the flaw and the stain can be accurately discriminated from each other from one or the plurality of inspection images irrespective of the flaw direction. Additionally, the irregularity and depth of the flaw can be discriminated by the simple processing.

BRIEF DESCRIPTION OF THE DRAWINGS

FIG. 4A is a sectional view showing reflected light observed with a camera, and FIG. 4B is an example of an inspection image including the stain and the flaw;

FIG. 5A is a sectional view showing reflected light observed with the camera, and FIG. 5B is an example of an inspection image including two kinds of flaws having different depth;

FIG. 6A is a sectional view showing reflected light observed with the camera, and FIG. 6B is an example of an inspection image including a recessed flaw and a projected flaw;

FIG. 10A is a perspective view, and FIG. 10B is a side view;

DETAILED DESCRIPTION

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. Embodiments of the present invention will be described below with reference to the drawings. A surface state inspection apparatus (hereinafter simply referred to as the inspection apparatus) according to an embodiment of the invention is an appearance inspection apparatus that inspects a surface of a mirror surface object by image analysis. For example, the inspection apparatus is suitably applied to detection of surface defects (flaw and stain) of magnetic and optical disks, a copper-clad laminate, a silicon wafer, a steel plate and a steel sphere, and a molded product.

First Embodiment

Figure 1:
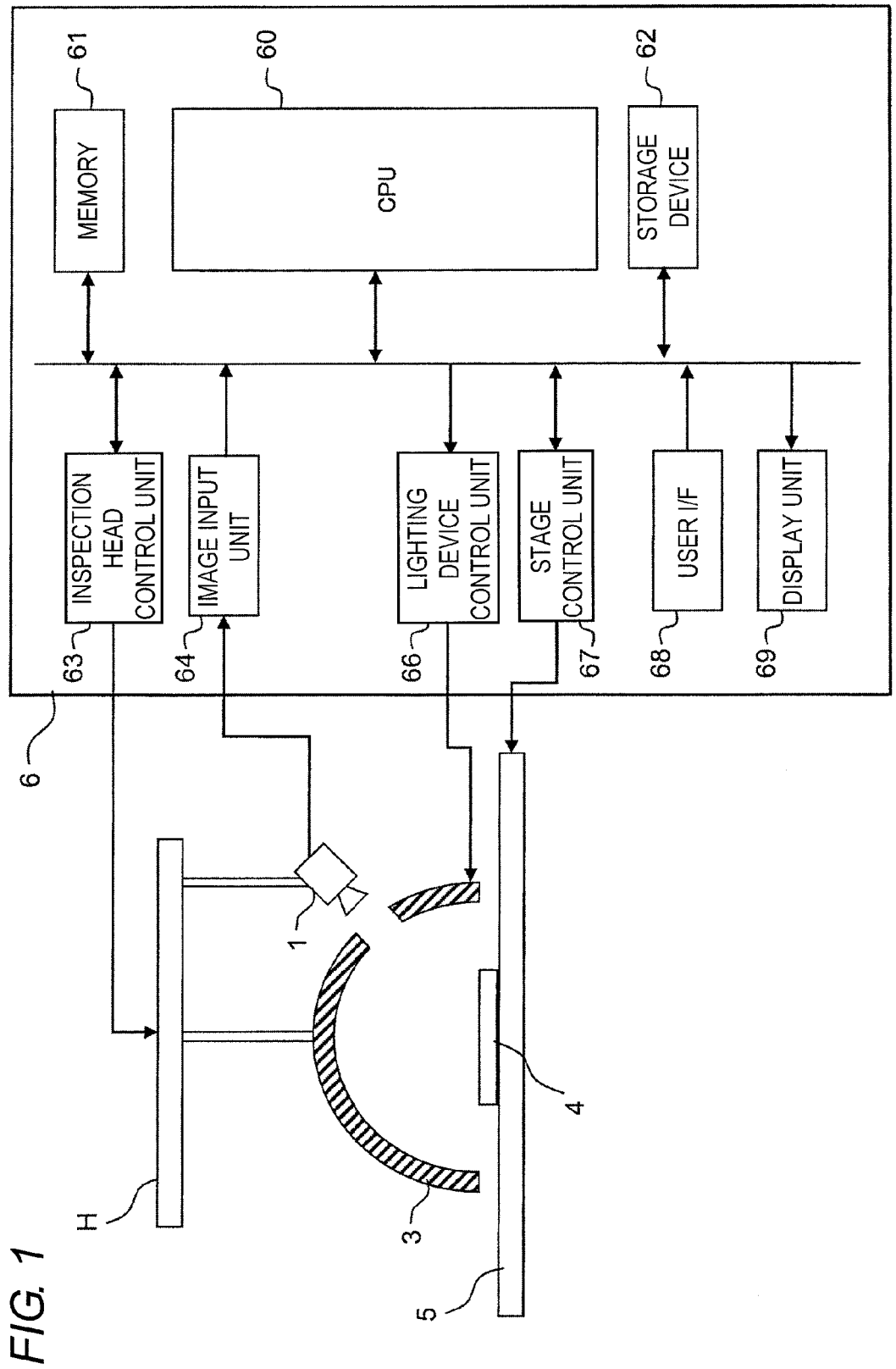
FIG. 1 is a view schematically showing a hardware configuration of an inspection apparatus.

An entire configuration of the inspection apparatus will be described with reference to FIG. 1. FIG. 1 is a view schematically showing a hardware configuration of the inspection apparatus.

The inspection apparatus roughly includes a stage 5, an inspection head H, and an information processing device 6. A lighting device 3 and a camera (image sensor) 1 are attached to the inspection head H. The lighting device 3 irradiates an inspection target 4 placed on the stage 5 with measuring light. The camera 1 takes an image of the inspection target 4 from obliquely above. The information processing device 6 includes a CPU (Central Processing Unit) 60, a memory 61, a storage device 62, an inspection head control unit 63, an image input unit 64, a lighting device control unit 66, a stage control unit 67, a user I/F 68, and a display unit 69. The inspection head control unit 63 has a function of controlling movement of the inspection head H in a Z-direction (a direction perpendicular to the stage 5), and the stage control unit 67 has a function of controlling movement of the stage 5 in an XY-direction. The lighting device control unit 66 has a function of controlling the lighting and lights-out of the lighting device 3 (and a change of a lighting pattern as the need arises). The image input unit 64 has a function of capturing a digital image from the camera 1. The user I/F 68 is an input device that is operated by a user. Examples of the user I/F 68 include a pointing device, a touch panel, and a keyboard. Measurement result is displayed on a screen of the display unit 69. For example, the display unit 69 is formed by a liquid crystal display.

During the inspection, the inspection head H and the stage 5 move relatively, and the inspection target 4 is positioned at a predetermined measurement position (in the embodiment of FIG. 1, the center (an intersection point of an optical axis of the camera 1 and the stage 5) of the lighting device 3). An image of the inspection target 4 is taken while the lighting device 3 irradiates the inspection target 4 with the measuring light. The information processing device 6 captures the image taken by the camera 1 through the image input unit 64, and the image is used in image analysis. A configuration and processing of the inspection apparatus will be described in detail.

(Lighting Device)

The lighting device 3 is a surface light source having a dome shape as shown in FIG. 1, and the whole dome-shape is a light emission region. Here, an opening for the camera 1 is provided in part of the lighting device 3. For example, the lighting device 3 can be formed by a dome-shape color filter and a light source that externally irradiates the measuring target 4 with white light. Alternatively, a plurality of LED chips may be arrayed inside the dome to irradiate the measuring target 4 with light through a diffuser plate. Alternatively, a liquid crystal display or an organic EL display may be formed into the dome shape to constitute the lighting device 3.

According to one or more embodiments of the present invention, the light emission region of the lighting device 3 is formed into the hemispherical dome shape such that the measuring target 4 is irradiated with light from all directions. The inspection target 4 is irradiated with the pieces of light having various incident angles, which allows the inspection to be realized irrespective of a direction of the flaw or stain (described later in detail).

Figure 2:
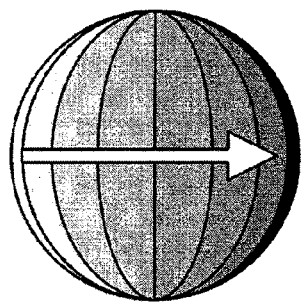
FIG. 2 is a view showing a color pattern in a light emission region of a lighting device in each of RGB.
Figure 2:
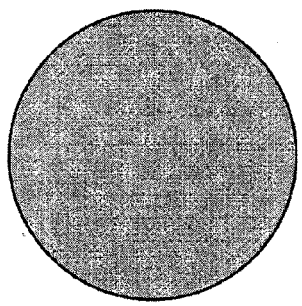
Figure 2:
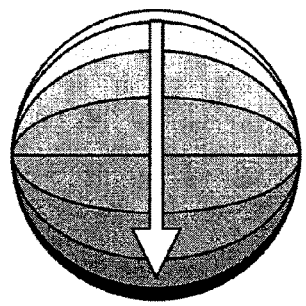

The light emission at the positions is set such that pieces of light having different spectral distributions are emitted at all positions in the light emission region of the lighting device 3. For example, when the light emission is realized by combining three color light components of red light (R), green light (G), and blue light (B), emission intensity of each RGB component is changed in a different direction on the dome as shown in FIG. 2. In this case, the emission intensity of the R component changes in an X-direction, the emission intensity of the G component is kept constant, and the emission intensity of the B component changes in a Y-direction. By means of the combination of the RGB components, the light emissions at the positions in the light emission region differ from one another in the combination of the RGB components. Accordingly, the pieces of light having different spectral distributions are emitted at all the positions, and the light emission can be set such that the pieces of light having the different spectral distributions (intensity ratio of RGB) are incident to the inspection target 4 depending on the incident direction. Not only the three color components but also three or more color components (color channel) may be used.

(Inspection Image)

Figure 3A:
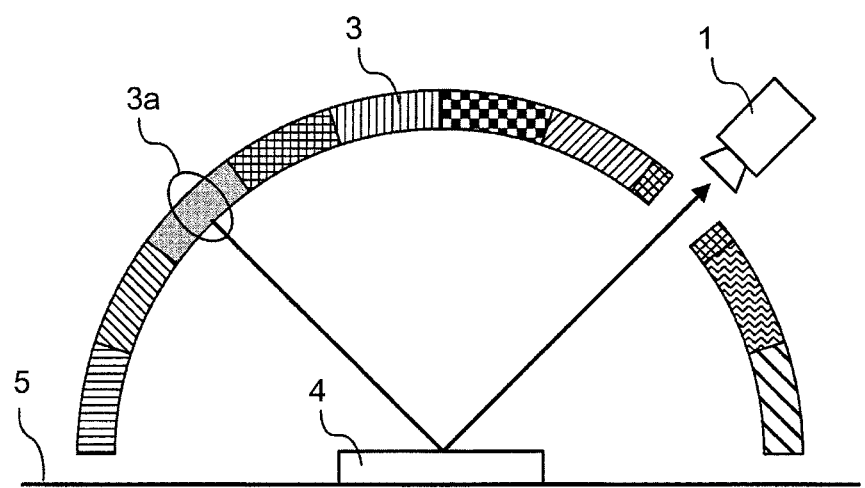
FIG. 3A is a sectional view showing a main part of the inspection apparatus.
Figure 3B:
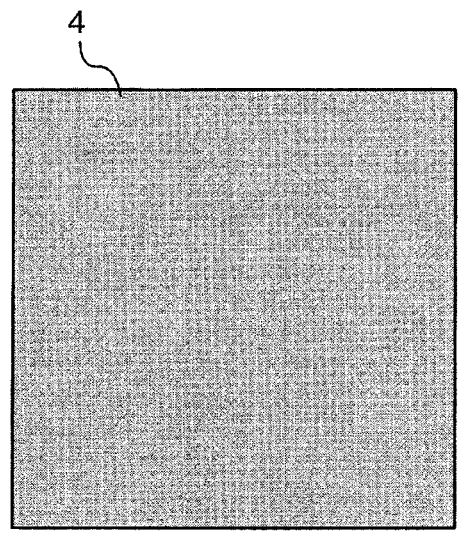
FIG. 3B is an example of an inspection image when a defect does not exist.

The feature of the inspection image obtained by the inspection apparatus of the first embodiment will be described with reference to FIGS. 3A and 3B. FIG. 3A is a sectional view showing a main part of the inspection apparatus. In FIG. 3A, a light emission region of the lighting device 3 is divided into a plurality of regions with different hatches. FIG. 3A schematically shows the fact positions in the light emission region differ from one another in a spectral distribution (color). In the actual lighting device 3, the spectral distribution changes continuously.

When the lighting device 3 irradiates the surface of the inspection target 4 with the measuring light, the camera 1 observes reflected light of the light (that is, the light emitted from a region 3a) that is incident from a regular reflection direction to the surface of the inspection target 4. Accordingly, when the defect does not exist in the surface of the inspection target 4 (when the inspection target 4 has a flat surface), an inspection image in which color (spectral feature) of the light at the position 3a emerges substantially evenly as shown in FIG. 3B is obtained.

(Detection and Discrimination of Stain and Flaw)

An inspection image that is obtained when a defect exists in the surface of the inspection target 4 will be described with reference to FIGS. 4A and 4B.

Figure 4A:
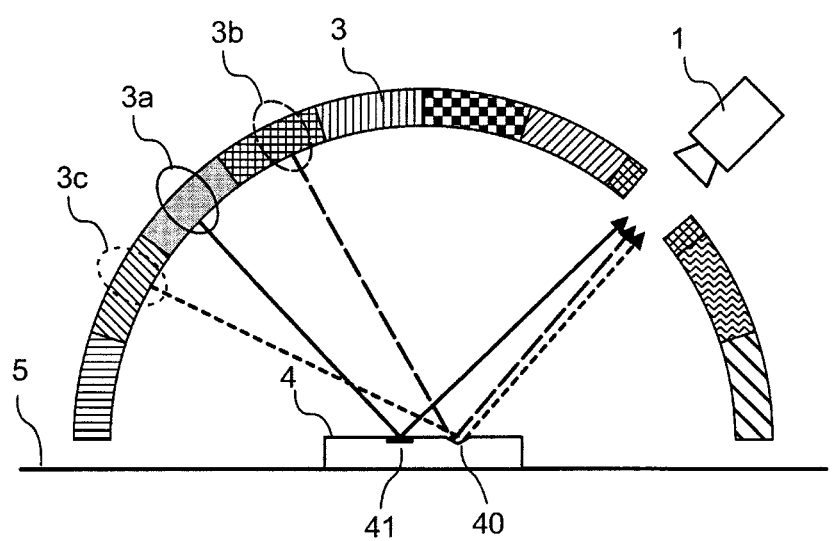
FIGS. 4A and 4B are views for describing discrimination between a stain and a flaw, where

In FIG. 4A, a stain 41 adheres to the surface of the inspection target 4. Because the regular reflection direction does not change in the surface even if the stain 41 adheres to the surface, the camera 1 observes the reflected light of the light emitted from the region 3a similarly to the portion in which the defect does not exists. However, because the reflection property changes (reflectance decreases) in the portion of the stain 41, the quantity of reflected light is reduced. As a result, as shown in FIG. 4B, the image in which only the brightness is reduced while the portion of the stain 41 is substantially equal to its surrounding portion (portion in which the defect does not exist) in the hue is obtained in the portion of the stain 41.

In FIG. 4A, a flaw 40 adheres to the surface of the inspection target 4. The regular reflection direction changes in the inclined surface of the flaw 40 when the recessed or projected flaw 40 exists in the surface. In FIG. 4A, the regular reflection direction in the inclined surface on the left of the flaw 40 becomes a direction of a region 3b, and the regular reflection direction in the inclined surface on the right becomes a direction of a region 3c. Therefore, the color of the reflected light observed with the camera 1 changes compared with the flat portion in which the defect does not exist. As a result, as shown in FIG. 4B, the image in which the portion of the flaw 40 differs from its surrounding portion (portion in which the defect does not exist) in the hue is obtained in the portion of the flaw 40.

The flaw and the stain can be discriminated from the one inspection image by utilizing the properties.

Figure 4B:
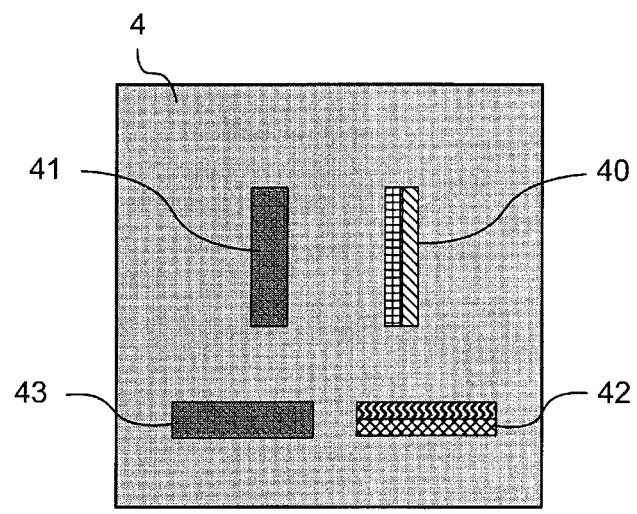

FIG. 4B shows a flaw 42 and a stain 43 extending in a horizontal direction. For the stains 41 and 43, a similar color feature (only the brightness is reduced while the stain portion is substantially equal to its surrounding portion in the hue) is observed irrespective of the direction. For the flaws 40 and 42, although the hue varies according to the direction, similarly the flaw portion differs from its surrounding portion in the hue. Thus, in the lighting device 3 of the first embodiment, because the inspection target 4 can be irradiated with light from various incident angles, the inspection can be realized irrespective of the direction of the flaw or stain.

(Discrimination of Flaw Depth)

The discrimination of the flaw depth will be described below with reference to FIGS. 5A and 5B.

Figure 5A:
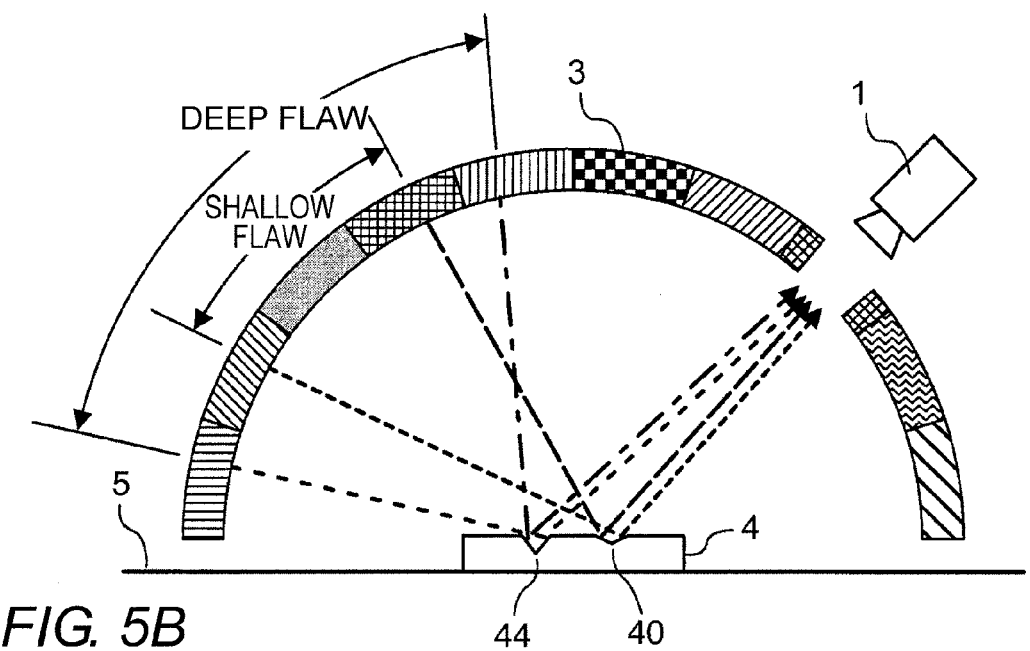
FIGS. 5A and 5B are views for describing discrimination of a flaw depth, where
Figure 5B:
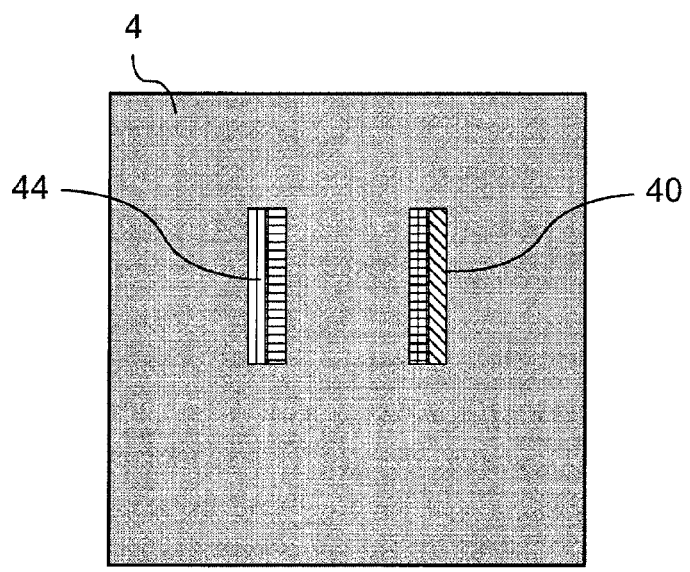

Referring to FIG. 5A, a deep flaw 44 and the shallow flaw 40 exist in the inspection target 4. When the deep flaw 44 and the shallow flaw 40 compared to each other, generally the deep flaw 44 tends to have a large inclination angle. Therefore, when the degree of the change in hue is observed in a direction from one of inclined surfaces to the other inclined surface (horizontal direction in FIG. 5B), the deep flaw 44 is larger than the shallow flaw 40 in the change in hue. As used herein, "degree of the change in hue" means a distance (or angle) in the light emission region of the lighting device 3. Accordingly, when attention is focused on the above-described properties, the flaw depth can be simply determined by checking the degree of the change in hue in the portion detected as the flaw.

(Discrimination of Flaw Irregularity)

The discrimination of the flaw irregularity will be described below with reference to FIGS. 6A and 6B.

Figure 6A:
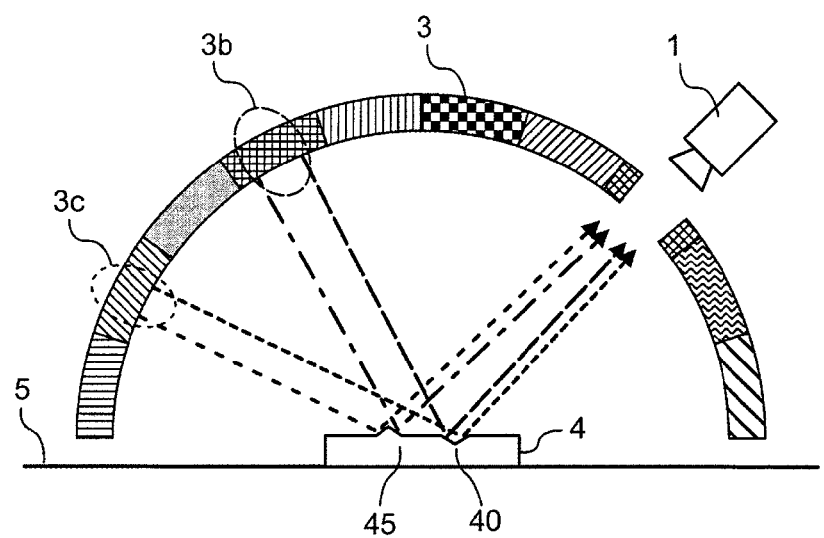
FIGS. 6A and 6B are views for describing discrimination of flaw irregularity, where
Figure 6B:
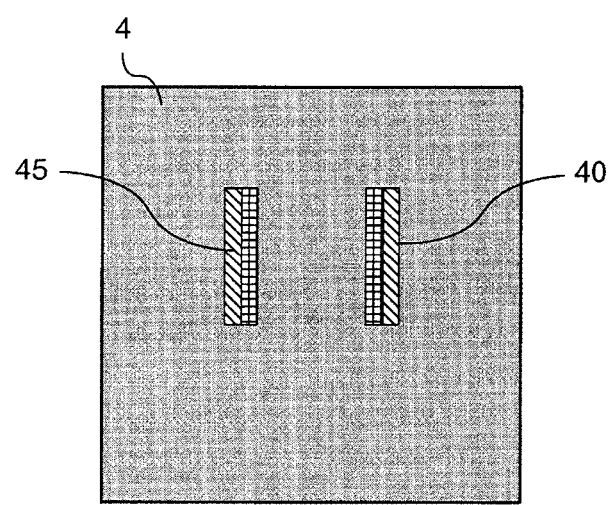

Referring to FIG. 6A, a projected flaw 45 and the recessed flaw 40 exist in the inspection target 4. As can be seen from FIG. 6A, the inclined surfaces on both sides are oriented outward in the projected flaw 45 while the inclined surfaces on both sides are oriented inward in the recessed flaw 40. Therefore, when the change in hue is observed in the direction from one of inclined surfaces to the other inclined surface (horizontal direction in FIG. 6B), the change in hue becomes reverse in the projected flaw 45 and the recessed flaw 40. Specifically, for the projected flaw 45, the direction of the change in hue is matched with the direction of the change in hue in the light emission region of the lighting device 3, the color of the region 3c emerges on the left and the color of the region 3b emerges on the right as shown in FIG. 6B. On the other hand, for the recessed flaw 40, the direction of the change in hue turns around, and the color of the region 3c emerges on the right and the color of the region 3b emerges on the left as shown in FIG. 6B. Accordingly, the flaw irregularity can be simply determined by checking whether the direction of the change in hue in the portion detected as the flaw is identical to the direction of the change in hue in the light emission region.

(Flow of Inspection Processing)

Figure 7:
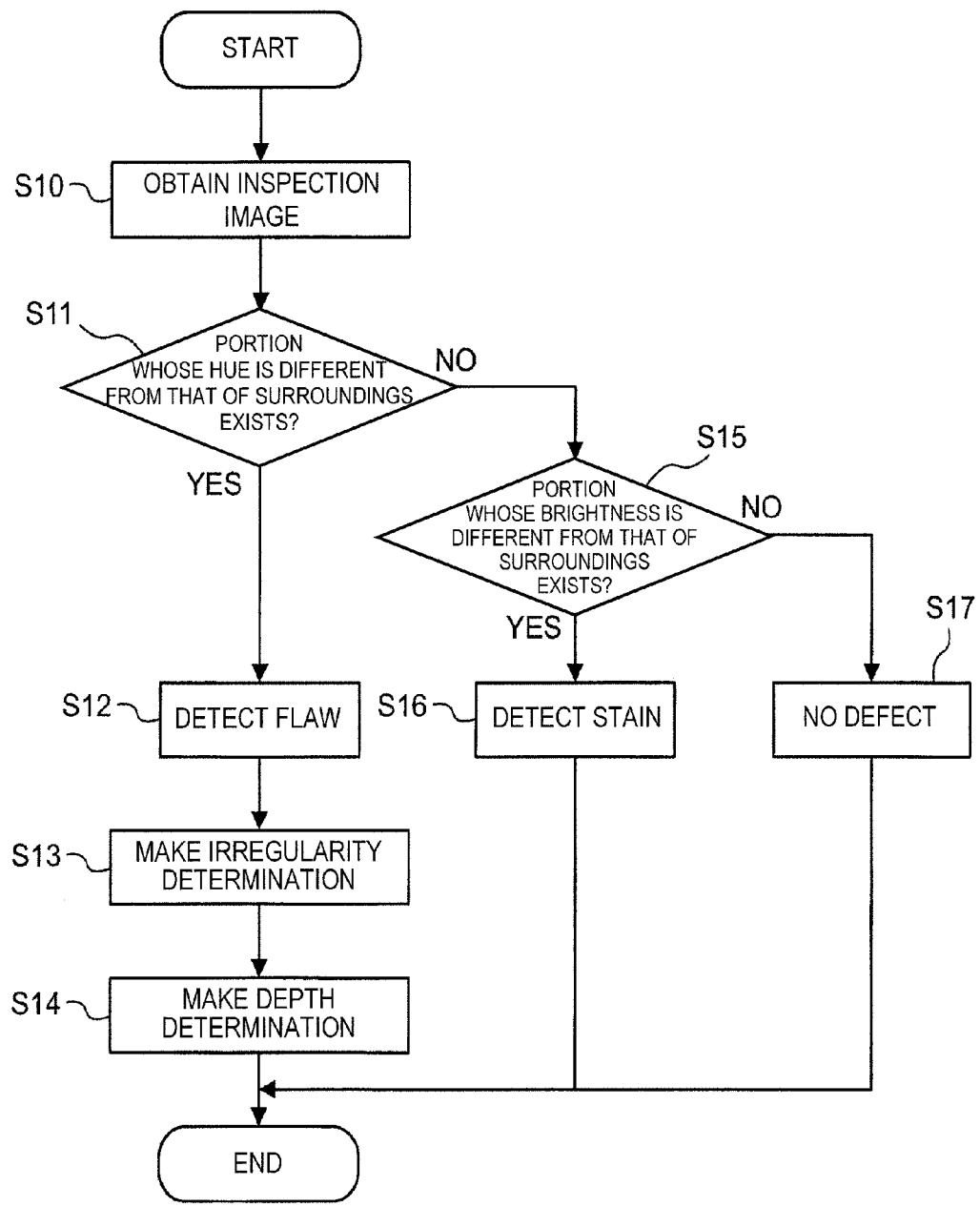
FIG. 7 is a flowchart showing a flow of inspection processing of the first embodiment.

A flow of inspection processing in which the properties of the inspection image are utilized will be described with reference to FIG. 7. FIG. 7 is a flowchart showing a flow of the surface state inspection processing. The CPU 60 of the information processing device 6 reads the program from the storage device 62 to execute the program, thereby realizing the pieces of processing. Alternatively, some or all pieces of processing may be formed by an ASIC or a PLD (Programmable Logic Device).

When the inspection target is positioned at a predetermined measurement position, the CPU 60 causes the lighting device 3 to irradiate the inspection target with light and causes the camera 1 to take the image (step S10). The CPU 60 captures the obtained inspection image through the image input unit 64. The CPU 60 detects the portion in which the hue changed from the inspection image (step S11). For example, the RGB value can be converted into the hue (H) value by the following equation:

$$H = \tan^{-1}\{\sqrt{3}(G-B)/(2R-G-B)\}$$

Obviously another conversion equation may be used, or the RGB value may be converted into the hue (H) value by an LUT (Look-Up Table). Alternatively, a proper index expressing the RGB ratio may be used as the hue. The CPU 60 performs processing such as clustering based on the hue value of each pixel of the inspection image, thereby detecting the portion whose hue is largely different from that of the surroundings (the hue region occupying most of the inspection image). The determination whether the hue of the portion is largely different from that of the surroundings can be made based on, for example, whether the difference in hue between the portion and the surroundings is larger than a predetermined threshold. When the CPU 60 can detect the portion (YES in step S11), the CPU 60 regards the portion as the "flaw" (step S12).

When the CPU 60 does not detect the portion whose hue is different from that of the surroundings (NO in step S11), the CPU 60 detects the portion whose brightness (lightness) changes from the inspection image (step S15). The RGB value may be converted into lightness Y by any method. For example, the RGB value is converted into the lightness Y by a method for determining an average of values of a maximum component and a minimum component of RGB, a method for determining an average of the RGB values, or a method of determining a weighted average using the following equation:

$$Y=0.299R+0.587G+0.114B$$

The CPU 60 performs the processing such as the clustering based on the lightness value of each pixel of the inspection image, thereby detecting the portion whose lightness is largely different from that of the surroundings (the lightness region occupying most of the inspection image). The determination whether the lightness of the portion is largely different from that of the surroundings can be made based on, for example, whether the difference in lightness between the portion and the surroundings is larger than a predetermined threshold. When the CPU 60 can detect the portion (YES in step S15), the CPU 60 regards the portion as the "stain" (step S16). If NO in step S15, the CPU 60 regards the portion as the "no defect" (step S17).

When the "flaw" is detected in step S12, the CPU 60 determines the flaw irregularity (step S13). Specifically, the CPU 60 selects two pixels which are arrayed in a direction orthogonal to the extending direction of the flaw and whose difference in hue is the maximum from the plurality of pixels constituting the flaw portion. When specifying the positions of two points in the light emission region corresponding to the hues of the selected two pixels, the CPU 60 compares the directions of the two changes in hue on the inspection image to the directions of the two changes in hue in the light emission region. When the directions of the two changes in hue on the inspection image are identical to the directions of the two changes in hue in the light emission region, the CPU 60 determines that the flaw is "projected flaw". When the directions of the two changes in hue on the inspection image are opposite to the directions of the two changes in hue in the light emission region, the CPU 60 determines that the flaw is "recessed flaw".

Then the CPU 60 determines a distance between the two points (or an angle about the measuring point) that are used in the irregularity determination in the light emission region, the CPU 60 determines that the flaw is "deep flaw" when the distance is larger than a predetermined threshold, and the CPU 60 determines that the flaw is "shallow flaw when the flaw is equal to or smaller than the predetermined threshold (step S14). For the projected flaw, "deep" means that an amount of projection from the surface is large, and "shallow" means that the amount of projection is small.

Finally the CPU 60 determines the surface state of the inspection target 4 is acceptable or defective based on the results obtained through the pieces of processing, and the CPU 60 outputs the inspection result on the display unit 69.

According to the inspection apparatus of the first embodiment, not only the detection of the flaw and stain but also the discrimination of the flaw and stain can be made from one inspection image. Additionally the inspection can be realized irrespective of the direction of the flaw or stain. Further, the irregularity and the depth of the flaw can be simply determined from one inspection image.

Figure 8:
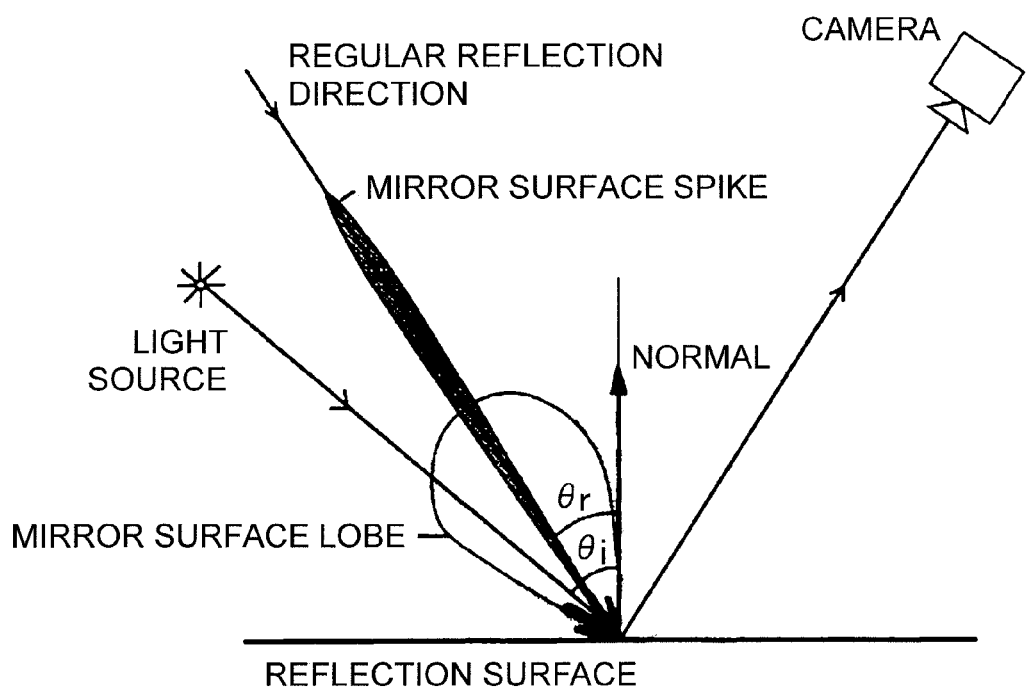
FIG. 8 is a view describing a reflectance property.

The measurement is accurately performed by utilizing the lighting device 3 even if the target has the uneven reflectance property. This will be described below. As shown in FIG. 8, the reflected light of the light incident to the object that does not have the perfect mirror surface includes the light (mirror surface spike) that is acute and narrow in the regular reflection direction and the light (mirror surface lobe) that spreads in a direction deviated from the regular reflection direction. The mirror surface lobe means the spread of the mirror surface reflected light, which is caused by a micro irregular surface (microfacet) on the measuring target surface. The spread of the mirror surface lobe increases as the orientation of the microfacet fluctuates, that is, as the surface is roughened. On the other hand, the measuring target surface comes close to the state of the perfect mirror surface with decreasing fluctuation of the spread of the microfacet. Here, the reflectance property is expressed by a deviation (angle) from the regular reflection direction and a light intensity ratio of the lobe to the spike. In the object having the uneven reflectance property, a shape of the mirror surface lobe varies according to surface roughness at each surface position. In the object having the extremely rough surface, the reflected light includes only the mirror surface lobe. The ratio of the mirror surface lobe and the mirror surface spike comes close to 1, and the mirror surface lobe and the mirror surface spike are hardly distinguished from each other.

Due to the spread of the mirror surface lobe, the luminance value in the inspection image is influenced by not only the light from the light emission region corresponding to the regular reflection direction but also the light from the surroundings of the light emission region. That is, in the object having the rough surface, the light from the light emission region corresponding to the regular reflection direction and the light from the surrounding region are mixed together, whereby a spectral property different from that of the perfect mirror surface is observed.

In such cases, if the lighting is performed such that the light from the surrounding region is just canceled to keep the spectral property similarly to that of the perfect mirror surface, the object having the uneven reflectance property or the object having the rough surface can be measured similarly to the object having the perfect mirror surface. In order to realize the measurement of the object having the uneven reflectance property or the object having the rough surface, in principle a light source distribution (lighting pattern) of the lighting device 3 is set as follows.

Figure 9:
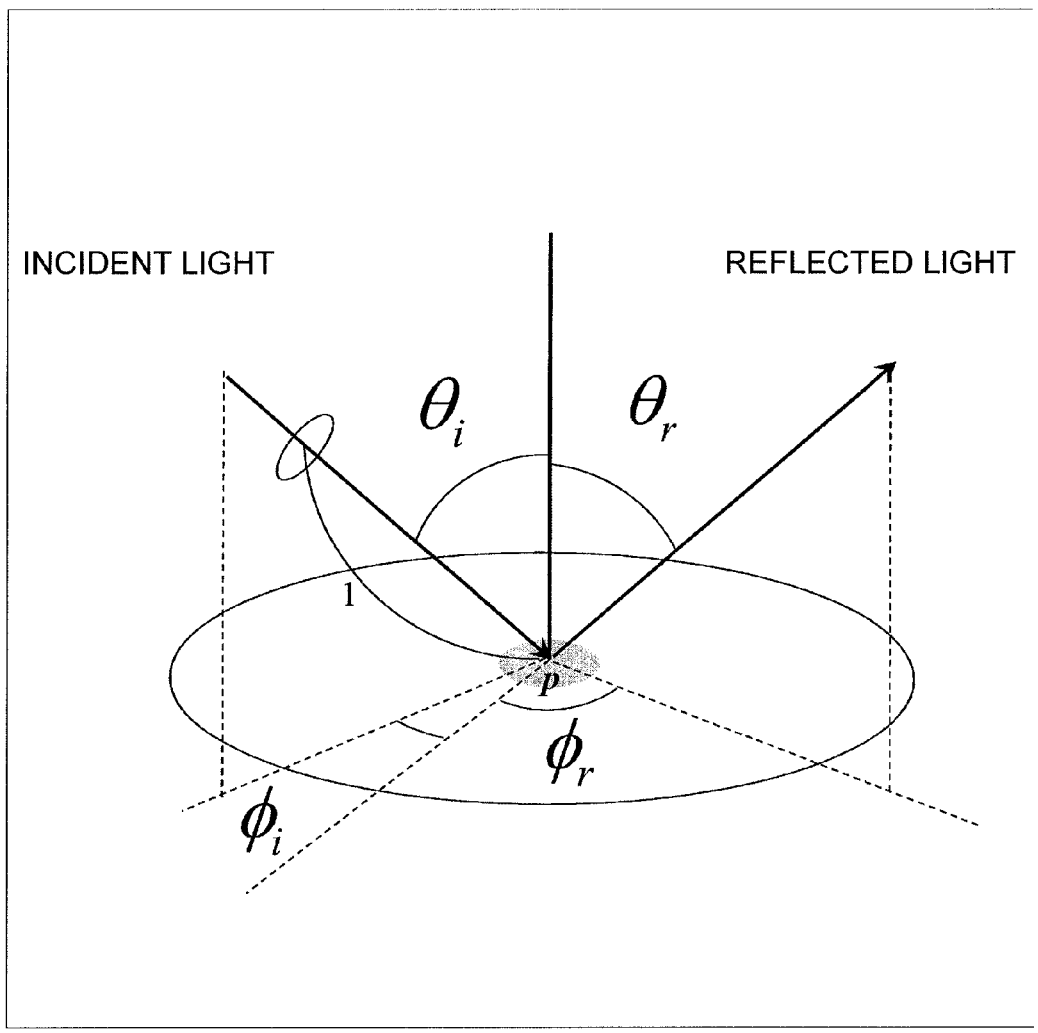
FIG. 9 is a view for describing incident light and reflected light.

Specifically, as shown in FIG. 9, assuming that $L_i(p, \theta_i, \phi_i)$ is radiance of the light source that is incident to a measuring point p from a direction of an incidence angle $(\theta_i, \phi_i)$, the following equation holds for any normal vector at the point p and any point-symmetric region $\Omega$ on the light emission region:

$$\iint_\Omega L_i(p,\theta_i,\phi_i) \cdot f(p,\theta_i,\phi_i,\theta_r,\phi_r) \sin\theta_i d\theta_i d\phi_i = k_f L_i(p,\theta_r,\phi_r) \quad \text{[Equation 1]}$$

where p is the measuring point on the object surface, (θi, φi) is the incident direction of the light source (θ is the zenith angle component and φ is the azimuth angle component, hereinafter the same), (θr, φr) is the reflection direction of the light of the light source (a visual-line direction of the camera), f is the reflectance property of the point p, Ω is a prospect solid angle of the mirror surface lobe in the reflectance property f, and kf is an attenuation ratio of the radiance (depending on the reflectance property of the object surface).

Figure 10A:
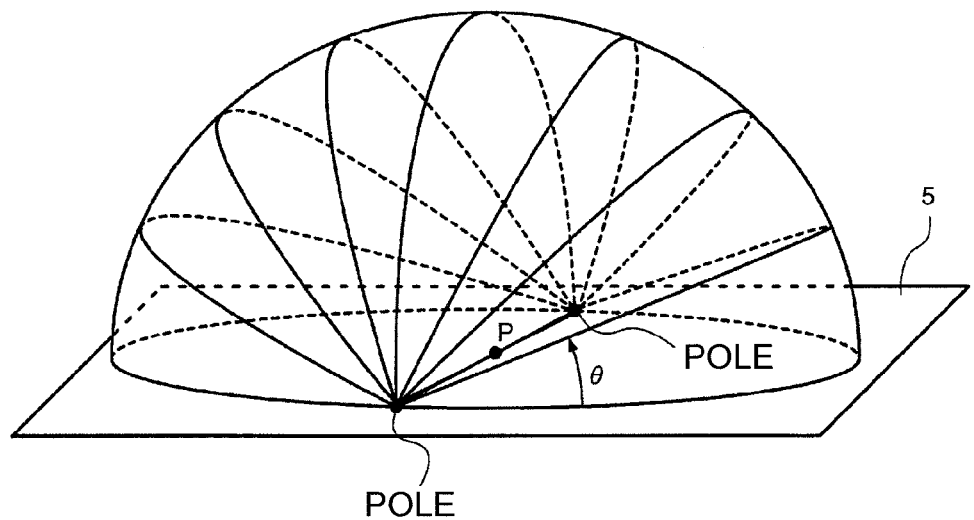
FIGS. 10A and 10B are views describing a change in each color of RGB in the light emission region of the lighting device, where
Figure 10B:
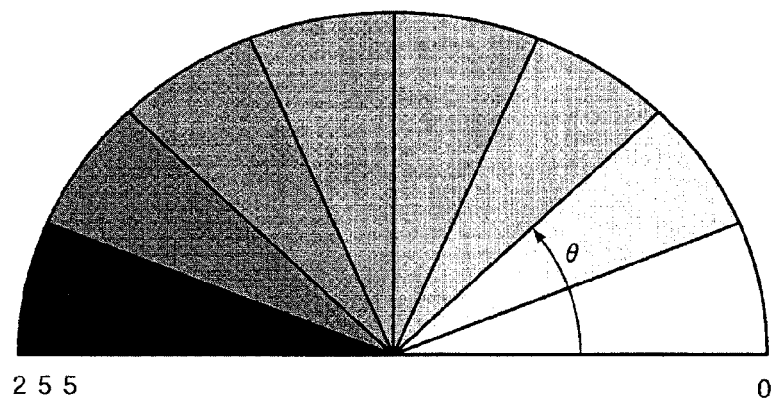

FIGS. 10A and 10B show a change in emission intensity (lighting pattern) of one piece of component light of the lighting device 3. FIG. 10A is a perspective view showing an isochromatic (iso-emission intensity) line of one piece of component light. FIG. 10B is a side view corresponding to FIG. 10A. An intersection line of a doom (hemisphere) and a plane passing through a diameter of the doom becomes the isochromatic line. For the sake of convenience, FIGS. 10A and 10B show that the emission intensity changes in a stepwise manner (changes in eight steps in the figure). However, actually the emission intensity (radiance) changes continuously. The change in emission intensity is set so as to change linearly with respect to the angle. More specifically, assuming that $L_{min}$ is a minimum value of the emission intensity, $L_{max}$ is a maximum value of the emission intensity, and θ is an angle formed by a horizontal plane (stage 5) and a plane including the isochromatic line, emission intensity L(θ) on the isochromatic line is set so as to satisfy a relationship of $L(\theta)=L_{min}+(L_{max}-L_{min})\times(\theta/\pi)$. When a "pole" is defined as shown in FIG. 10A, θ constitutes a longitude, and the light source distribution (lighting pattern) of the first embodiment can be expressed so as to change linearly with respect to the longitude. Alternatively, assuming that a central axis is a straight line that is parallel to the stage 5 to pass through a point O at which the inspection target is placed, the lighting pattern can be expressed such that the emission intensity changes linearly with respect to the angle θ around the central axis. The lighting pattern is one of approximate solutions of the equation. The lighting pattern of the lighting device 3, which is obtained by overlapping the patterns of the pieces of RGB component light, also becomes an approximate solution of the equation.

Figure 11:
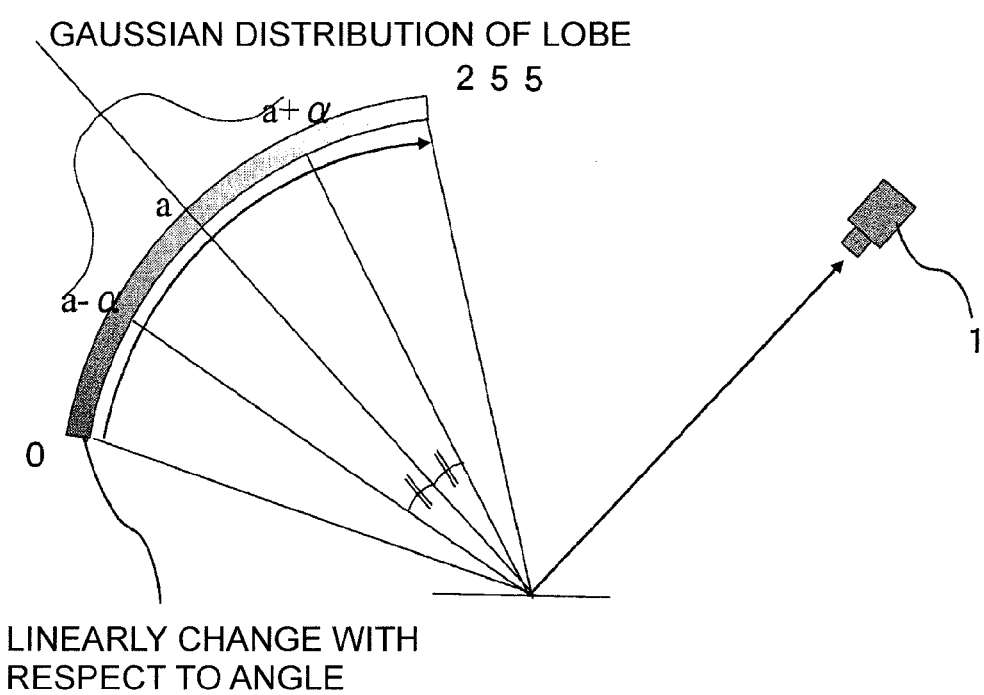
FIG. 11 is a view for describing a mirror surface lobe cancelling effect.

The influence of the mirror surface lobe can be canceled by using such a lighting pattern, and this will be described from another standpoint with reference to FIG. 11. FIG. 11 shows a one-dimensional direction of a direction of a change in luminance at which light close to ideal is obtained in order to describe an effect of the lighting pattern in the first embodiment. As shown in FIG. 11, only pieces of light from positions at an angle a (regular reflection direction), an angle a+α, and an angle a−α are considered. It is assumed that lobe coefficients σ of the pieces of light from the positions at the angles a+α and a−α are identical to each other. It is assumed that the emission intensity of the lighting device 3 is proportional to the angle, and it is assumed that (a−α)L, aL, and (a+α)L are the emission intensity in each of the positions at the angles a−α, a, and a+α. The pieces of light reflected from the three points are combined as σ(a−α)L+aL+σ(a+α)L=(1+2σ)aL, and it is found that the influence of the diffusion light of the light from the surrounding region is canceled. Although only the two points a±α are considered in this case, it is easily understood that the whole influence of the diffusion light of the light from the surrounding region is canceled. The same holds true for each of the pieces of RGB component light, and therefore the feature quantity expressed by the emission intensity ratio of the RGB colors becomes identical to that of the perfect mirror surface reflection. Accordingly, even if the object has the uneven reflectance property, similarly to the perfect mirror surface reflection, the surface state of the inspection target can be accurately inspected from one taken image.

The above description is made in the direction in which the ideal effect is obtained. Although the linearity collapses in other directions not to be able to exactly cancel the influence of the diffusion reflection, the influence of the diffusion reflection can be removed within the practically trouble-free range.

(Modification of Lighting Device)

Figure 12A:
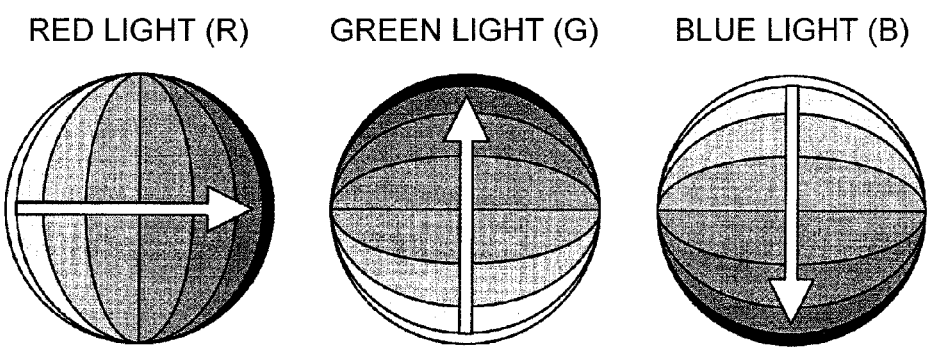
FIGS. 12A and 12B are views each showing a modification of a lighting pattern.
Figure 12B:
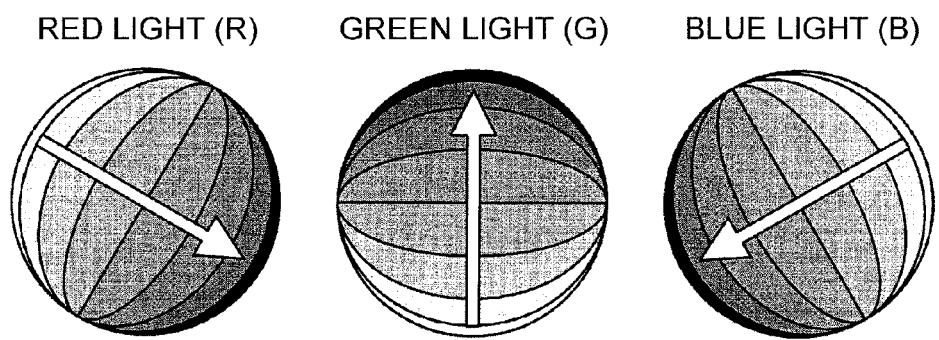

The lighting pattern is not limited to the first embodiment. For example, as shown in FIGS. 12A and 12B, a pattern in which the three colors change in different directions may be combined.

In the first embodiment, the target can be inspected only by one-time measurement (lighting and shooting) using the lighting device in which the lighting patterns having the different color channels are overlapped. Alternatively, although the measuring time is lengthened compared with the first embodiment, the images are taken by sequentially lighting at least two kinds of the lighting patterns, and the inspection may be performed using the obtained plurality of images. The same inspection result can be obtained by the alternative method. When the images are taken while the lighting patterns are switched, a plurality of monochrome lighting patterns having different emission intensity distributions can also be used (in such cases, a monochrome camera may be used).

When the plurality of sequentially-taken inspection images are used, the CPU 60 determines a ratio of pixel values among the plurality of inspection images for each pixel in the inspection image. For example, when the inspection target is sequentially irradiated with the lighting patterns of the pieces of light having different colors such as R, G, and B to obtain the inspection images of R, G, and B, the ratio of the pixel values among the inspection images becomes an RGB ratio, that is, information indicating the hue. Even if the inspection target is sequentially irradiated with the lighting patterns of the light having the identical color rather than the different color, when the inspection images obtained with the lighting patterns are regarded as color channels, the ratio of the pixel values among the inspection images can be treated as information equivalent to the hue. Therefore, the inspection processing similar to that of the first embodiment can be realized by the use of the ratio of the pixel values instead of the RGB ratio in the inspection image of the first embodiment.

Figure 13A:
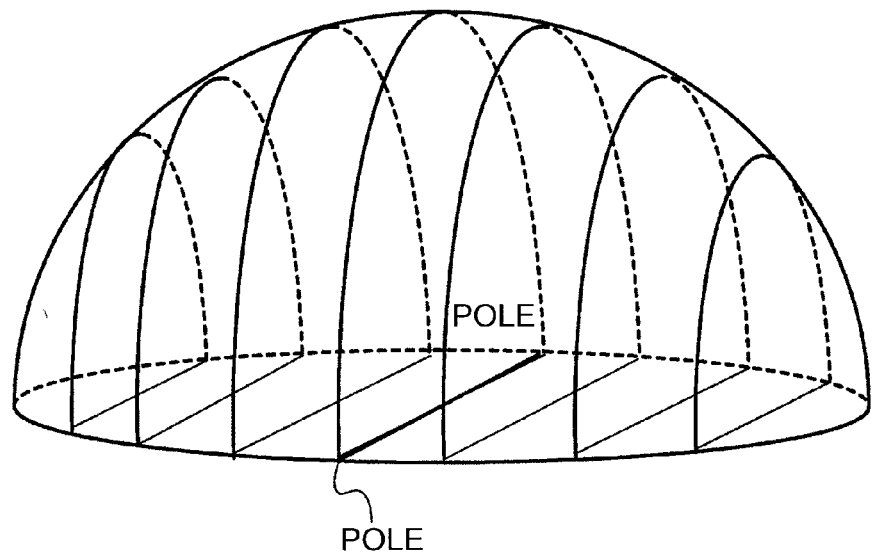
FIGS. 13A and 13B are views each showing a modification of a lighting pattern.
Figure 13B:
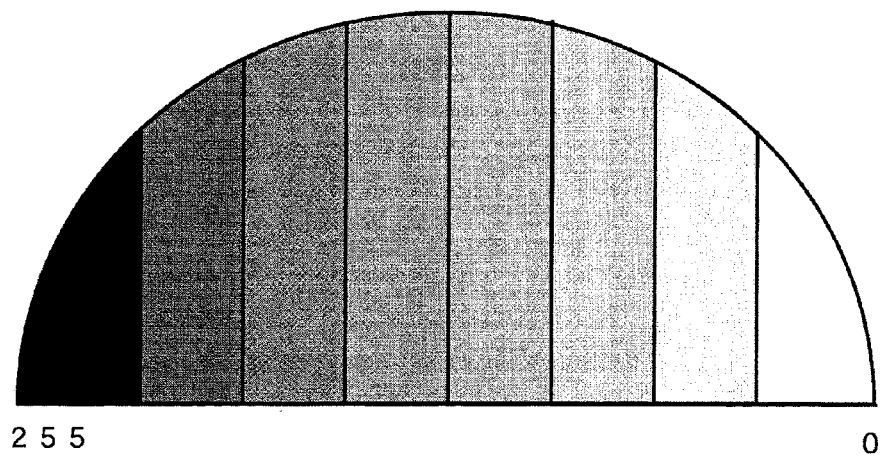

The lighting pattern in which the emission intensity changes linearly with respect to the angle in the longitude direction is used in the first embodiment. Alternatively, for example, the lighting pattern in which the emission intensity changes linearly in the latitude direction may be used as shown in FIG. 13. Such a lighting pattern is also one of the approximate solutions of the equation, and the influence of the mirror surface lobe can be substantially canceled to detect the regularly-reflected light.

Figure 14A:
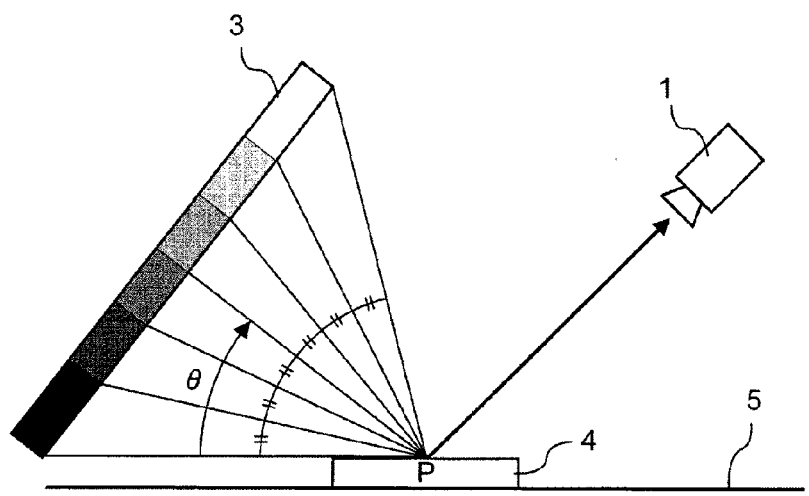
FIGS. 14A and 14B are views each showing a configuration of an inspection apparatus including a plate-shaped lighting device.
Figure 14B:
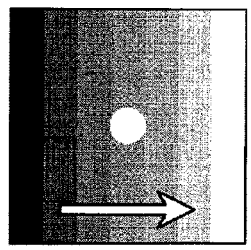
Figure 14B:
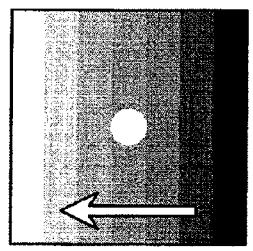
Figure 14B:
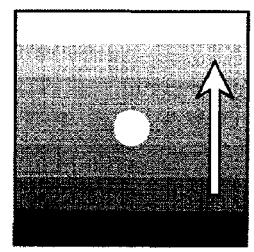

The shape of the lighting device 3 is not limited to the doom shape (hemispherical shape), but a plate shape may be used as shown in FIG. 14A. A shape in which the plate is curved into an arc may also be used. Even in the lighting device 3 having the plate shape or the shape in which the plate is curved into the arc, when the lighting pattern is set such that spectral distributions of the light emission at all the positions in the light emission region differ from one another, the surface state of the inspection target 4 can be inspected by the one-time measurement. In an example of FIG. 14B, a red light (R) pattern in which the emission intensity increases rightward, a green light (G) pattern in which the emission intensity increases leftward, and a blue light (B) pattern in which the emission intensity increases upward are overlapped. Even in this case, as shown in FIG. 14A, the influence of the mirror surface lobe can be substantially canceled by linearly changing the emission intensity according to an angle θ in each pattern. Where θ is an angle around a straight line that passes through the point P (the point at which the inspection target is disposed) and parallel to the stage 5. Alternatively, θ can also be expressed as an angle that is formed by the plane parallel to the stage 5 and the plane passing through the iso-emission intensity line (isochromatic line) on the light emission region of the lighting device 3 and the point P.

Second Embodiment

Figure 15A:
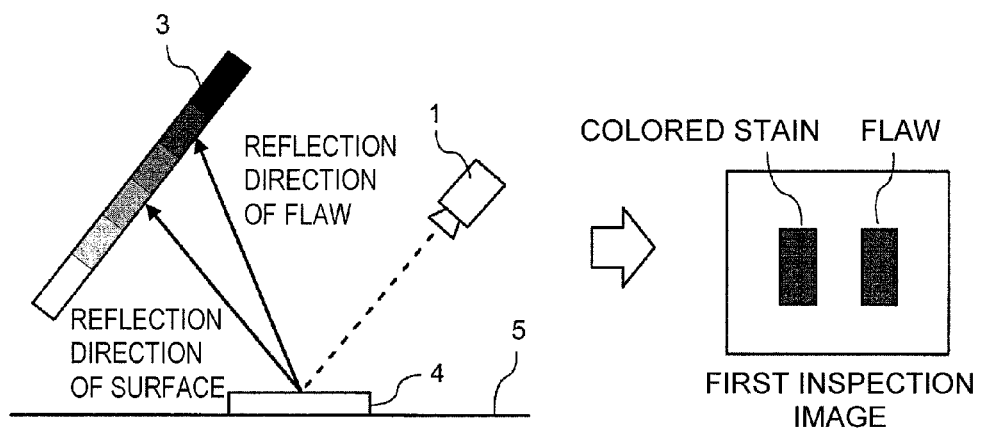
FIGS. 15A and 15B are views each describing discrimination between a colored stain and a flaw in a second embodiment.

Occasionally a colored stain adheres to the surface depending on the inspection target. The colored stain means one, in which not the mirror reflection but the diffuse reflection becomes dominant in the portion to which the stain adheres and the color of the stain is observed as the reflected light. For the colored stain, because the color of the stain emerges on the inspection image irrespective of the color of the light incident from the regular reflection direction, the discrimination whether the colored stain is the stain or the flaw is hardly made only by checking the difference in hue between the colored stain and the surroundings (portion in which the stain does not exist). FIG. 15A shows an example. The colored stain exists in the surface of the inspection target 4, and the hue of the colored stain is accidentally matched with that of the color of the reflected light in the flaw portion. Therefore, the colored stain and the flaw cannot be distinguished from each other only by one inspection image.

Therefore, in an inspection apparatus according to a second embodiment, when the portion detected as the flaw exists in the inspection image, the imaging is performed while a constitution of the spectral distributions of the pieces of light emitted from the positions in the light emission region of the lighting device 3 is changed, and a second inspection image of the inspection target 4 is obtained to check the change in hue between the two inspection images, thereby determining "flaw" and "colored stain".

Figure 15B:
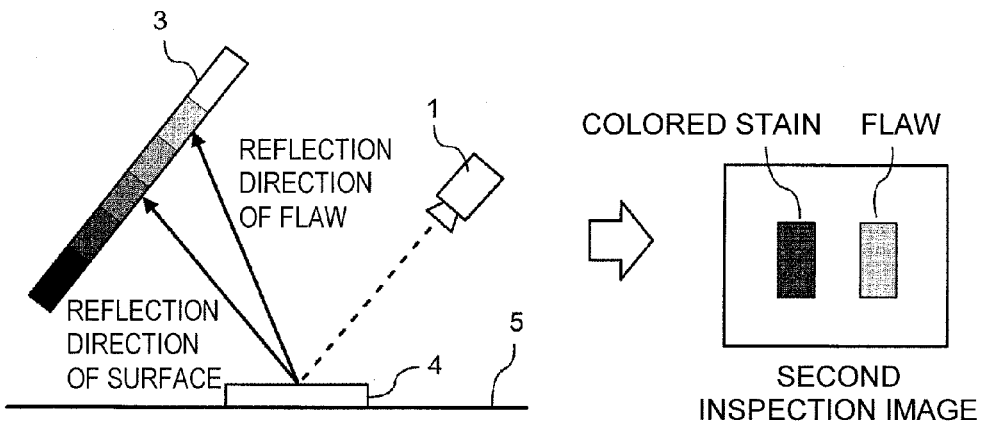
Figure 16:
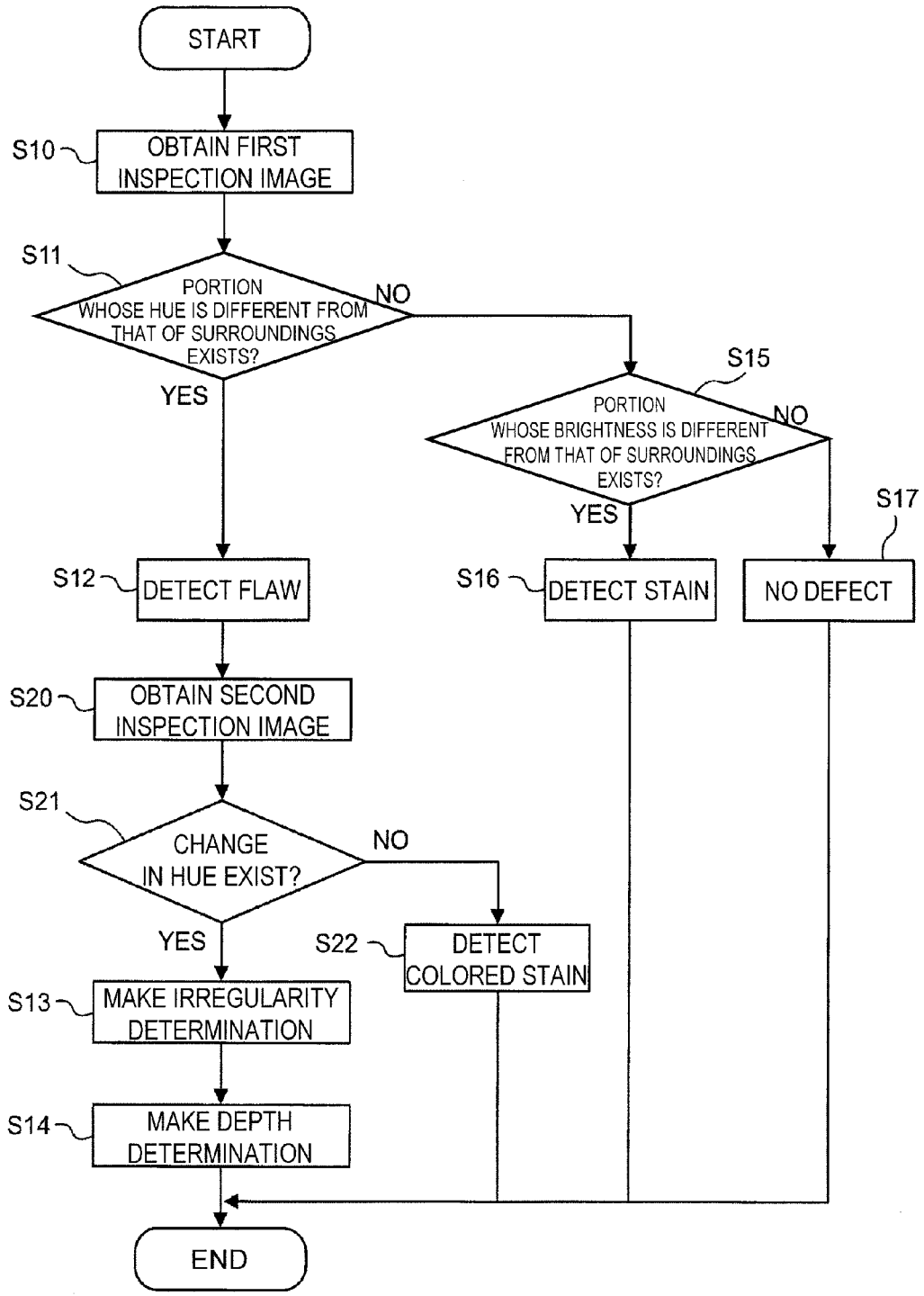
FIG. 16 is a flowchart showing a flow of inspection processing of the second embodiment.
Figure 17A:
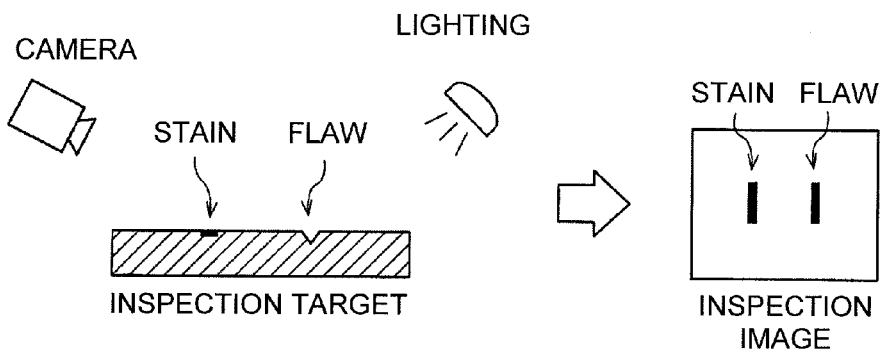
FIGS. 17A to 17C are views for describing appearance inspection.
Figure 17B:
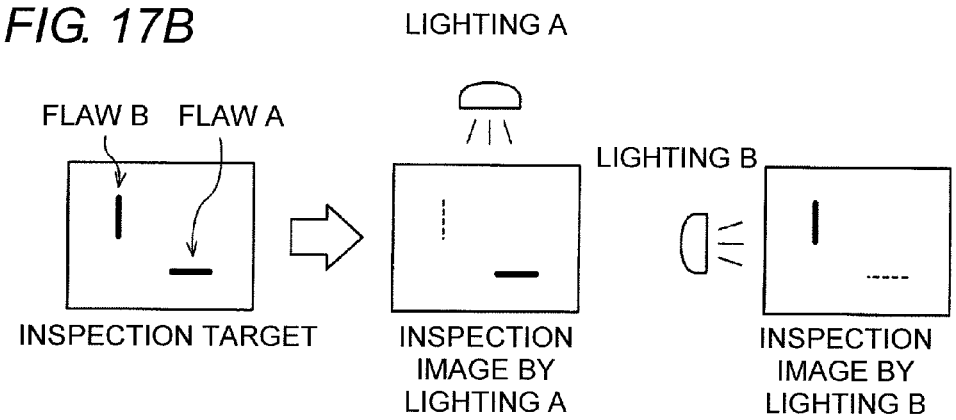
Figure 17C:
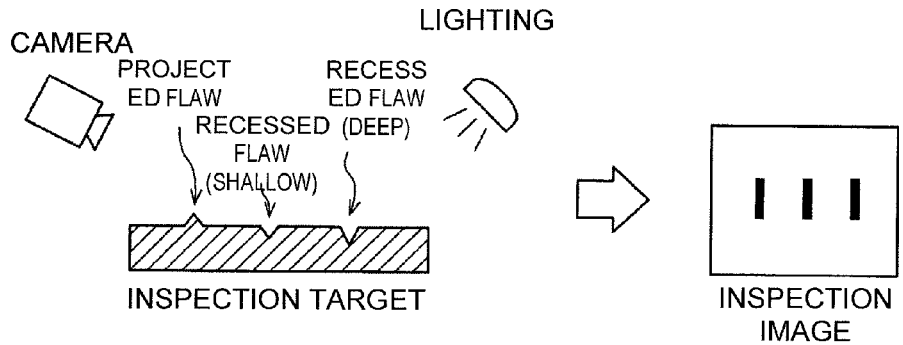

FIG. 16 is a flowchart showing inspection processing of the second embodiment. Pieces of processing steps S20 to S22 are added to the inspection processing of the first embodiment. That is, when the portion seemed to be "flaw" is detected in step S12, the CPU 60 changes the lighting pattern of the lighting device 3 to take the second inspection image (step S20). FIG. 15B shows an example of the second inspection image that is obtained by changing the lighting pattern. As can be seen from FIG. 15B, the first inspection image is identical to the second inspection image in that the hue does not change in the colored stain portion, while the first inspection image is different from the second inspection image in that the hue changes in the flaw portion. The CPU 60 checks the change in hue of the portion seemed to be "flaw" (step S21), and the CPU 60 determines that the portion is "colored stain" when the degree of the change in hue is larger than a predetermined threshold (step S22). When the degree of the change in hue is equal to or smaller than the predetermined threshold, the CPU 60 determines that the portion is "flaw", and the flow goes to processing in step S13.

As described above, the colored stain can also be detected with high accuracy.

<Modification>

In the second embodiment, the lighting pattern of the lighting device 3 is changed to take the second inspection image. Alternatively, while the lighting pattern of the lighting device 3 does not change, a relative position between the lighting device 3 and the inspection target 4 is changed to take the second inspection image, which allows the lighting condition to be changed by any method when the spectral feature of the light incident to the flaw portion can be changed.

The flaw and colored stain being confused does not occur for the method, in which the inspection target is sequentially irradiated with the plurality of lighting patterns of the pieces of light having the identical color to obtain the plurality of inspection images and the defect is detected using the ratio of the pixel values. When the pieces of light having the identical color are used, the quantity of reflected light is reduced by a fixed ratio irrespective of the color of the stain, thereby obtaining the image in which only the brightness is reduced while the ratio of the pixel values is substantially kept constant. Accordingly, similarly to the stain that is not colored, the colored stain can be detects as "portion in which the colored stain differs from the surroundings in the brightness while the ratio of the pixel values is substantially kept constant".

The determination between the flaw and the stain, the determination of flaw irregularity, and the determination of the flaw depth are performed in the flowchart of the first embodiment. The determination between the flaw and the colored stain is also performed in the flowchart of the second embodiment. Alternatively, depending on the kind of the inspection target or the purpose of the inspection, when the unnecessary processing exists, the unnecessary processing may be eliminated or the order of the pieces processing may be interchanged.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A surface state inspection apparatus comprising:
    a lighting device that irradiates an inspection target placed on a stage with light;
    an imaging device that images the inspection target; and
    a detection device that detects a surface defect of the inspection target by analyzing a first inspection image obtained by the imaging device, wherein
    the lighting device is a surface light source that includes a light emission region having a predetermined size and, in the lighting device, portions of light emitted from positions in the light emission region differ from each other in a spectral distribution,
    the detection device detects a portion in which a hue is different from that of its surrounding portion in the inspection target surface as a flaw, and
    the detection device detects a portion in which the hue is substantially equal to that of its surrounding portion while brightness is different from that of its surrounding portion as a stain.

2. The surface state inspection apparatus according to claim 1, wherein
    the detection device determines irregularity of the flaw based on a direction of a change in hue in the portion detected as the flaw.

3. The surface state inspection apparatus according to claim 1, wherein
    the detection device determines a depth of the flaw based on a degree of the change in hue in the portion detected as the flaw.

4. The surface state inspection apparatus according to claim 1, wherein the detection device obtains a second inspection image of the inspection target by changing a constitution of the spectral distributions of the portions of light emitted from the positions in the light emission region of the lighting device or by performing the imaging while changing a relative position between the light emission region and the inspection target, when the portion detected as the flaw exists in the first inspection image, and the detection device determines that the portion is not the flaw but a colored stain when the first inspection image is substantially equal to the second inspection image in the hue of the portion detected as the flaw.

5. A surface state inspection method comprising the steps of:

irradiating an inspection target placed on a stage with light using a lighting device;

imaging the inspection target using an imaging device; and detecting a surface defect of the inspection target by analyzing an inspection image obtained in the imaging step, wherein the lighting device is a surface light source that includes a light emission region having a predetermined size and, in the lighting device, portions of light emitted from positions in the light emission region differ from each other in a spectral distribution, and in the detection step, a portion in which a hue is different from that of its surrounding portion in the inspection target surface is detected as a flaw, and a portion in which the hue is substantially equal to that of its surrounding portion while brightness is different from that of its surrounding portion is detected as a stain.

* * * * *